United States Patent Office 3,605,390
Patented Sept. 20, 1971

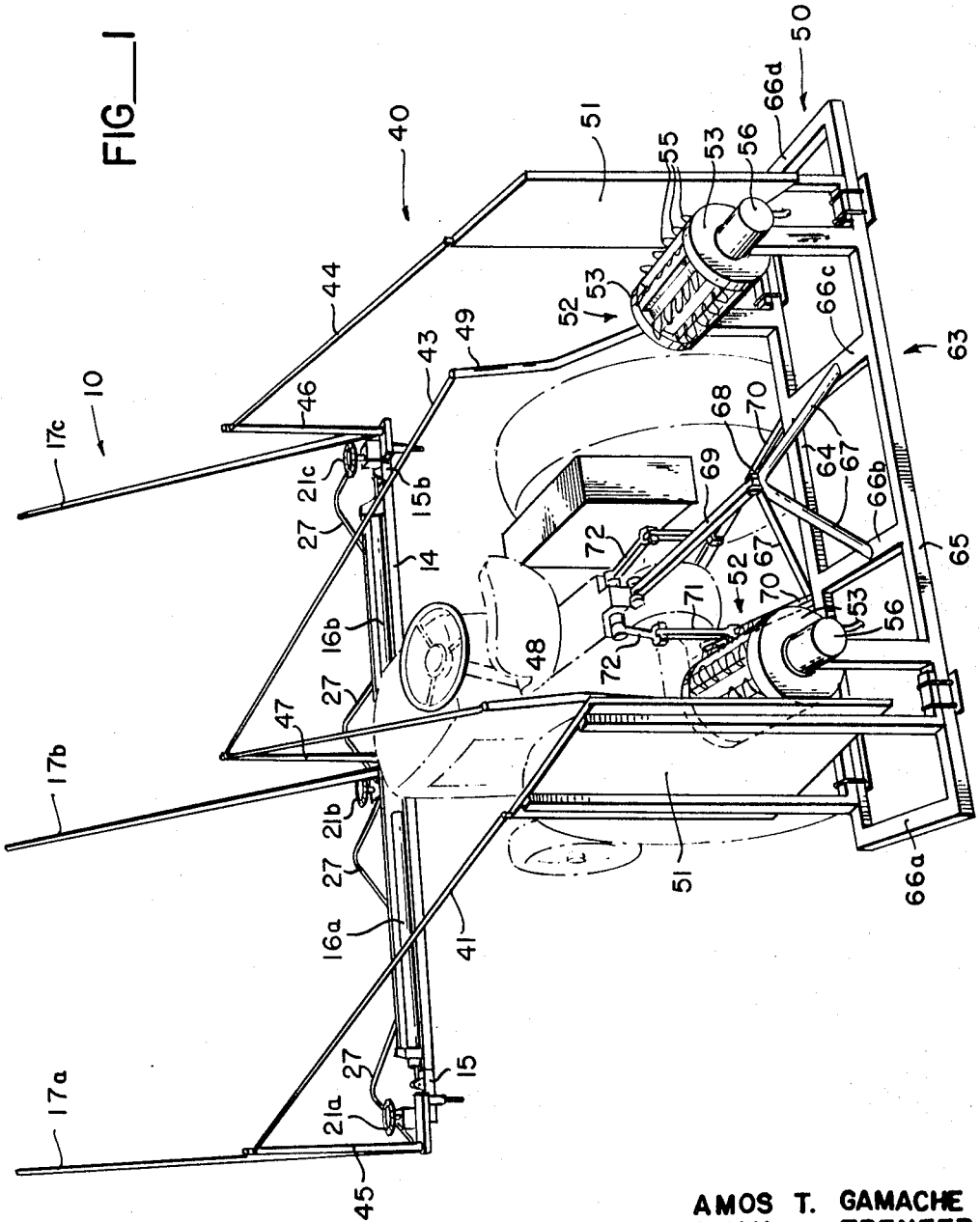

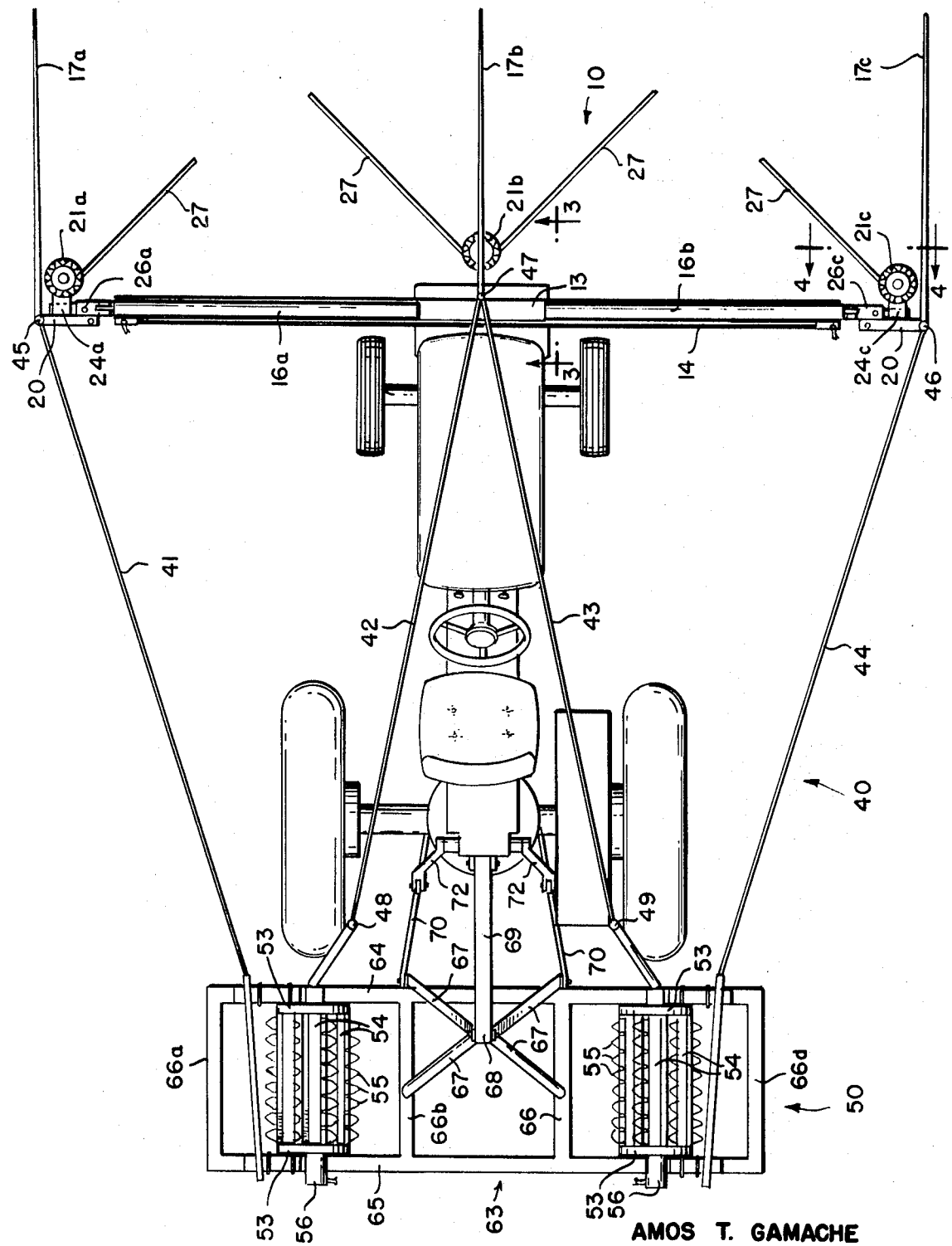

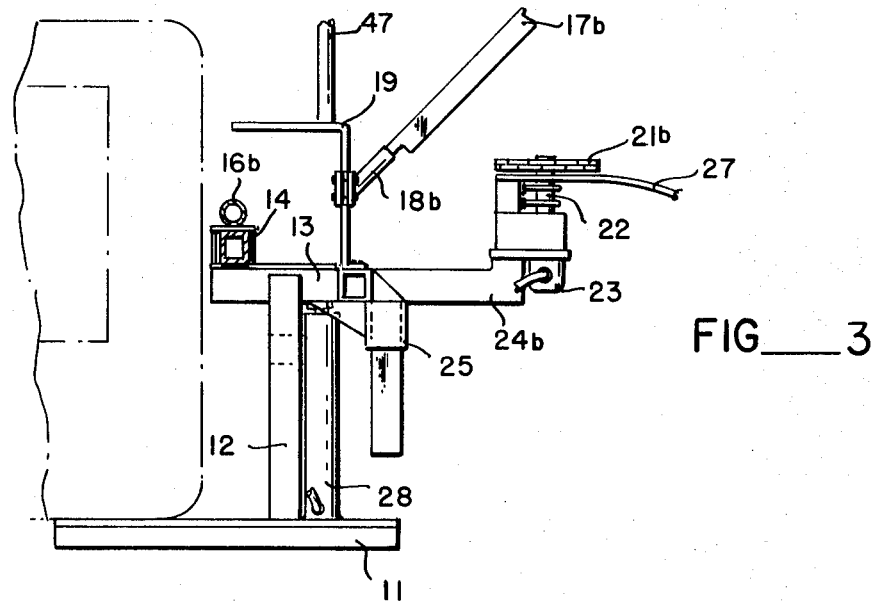
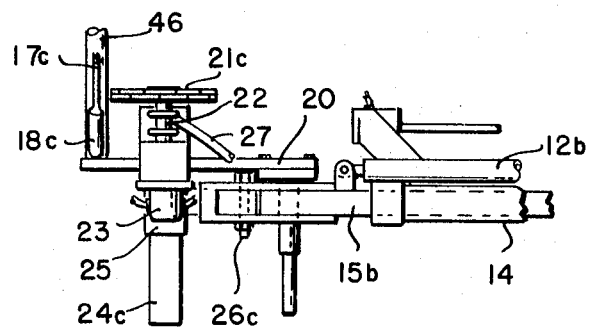
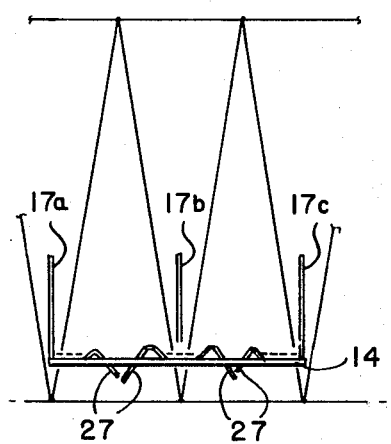

3,605,390
MACHINE FOR PREPARING HOPS
FOR HARVESTING
Amos T. Gamache, 211 S. 24th St., Yakima, Wash. 98902, and Alvin Treneer, 512 Bolin Drive, Toppenish, Wash. 98948
Filed Dec. 5, 1968, Ser. No. 781,558
Int. Cl. A01d 41/08
U.S. Cl. 56—16.5                                     11 Claims

ABSTRACT OF THE DISCLOSURE

A machine is disclosed for preparing vertically suspended hop vines for harvesting and includes a crossarm assembly attached to a power vehicle. On the crossarm assembly are mounted blades which project into the paths of the hop vines. The blades are spaced a distance apart essentially equal to the row spacing of the hop vines. The blades, as they are advanced through the hop vines sever the interconnecting hop vines and guide the hop vines to cutting zones where rotary cutters sever the hop vines near their base. The base-severed vines are then guided to a stripping zone where the foliage is stripped from the lower ends of the base-severed hop vines by rotary beaters coacting with baffle plates.

BACKGROUND OF THE INVENTION

This invention relates to a machine for severing hop vines at their base and stripping the foliage from the lower ends of the base-severed hop vines.

DESCRIPTION OF THE PRIOR ART

Hop vines have usually been prepared for harvesting by manual labor. Usually two people are employed, one to sever the vines near their base and another to sever them at the top. The severed vines are then loaded on a truck or trailer for delivery to a hop-picking machine. Although there are many known hop-picking machines, there have been no machines available for preparing hops for harvesting, these machines doing substantially the job of the laborers who have heretofore severed the vines by hand.

SUMMARY OF THE INVENTION

This invention relates to a machine for severing interconnecting hop vines and guiding the vertically suspended hop vines into a cutting zone by means of vertically projecting blades mounted on a crossarm assembly attached to a power vehicle. The vertically projecting blades are spaced a distance apart substantially equal to the distance between the rows of hops. The hop vines are severed in the cutting zone near their base by cutters located adjacent the blades. The severed hop vines are then guided by suitable guide means to a stripping assembly which strips the foliage from the lower ends of the hop vines. The stripping assembly comprises two opposed elements defining a stripping zone therebetween, the first element being an upstanding baffle plate vertically mounted on a crossarm assembly and the second element a cylindrical member having stripping elements mounted thereon, the second element also mounted on the crossarm assembly. Stripping elements, preferably U-shaped fingers, coacting with the baffle plate, strip substantially all of the foliage from the lower ends of the hop vines.

BRIEF DESCRIPTION OF THE DRAWINGS

FIG. 1 is an isometric view of the machine of this invention showing the means for guiding the vertically suspended hop vines to the cutting zone, means for guiding the hop vines from the cutting zone to the stripping zone and stripping assembly.

FIG. 2 is a top plan of the machine for preparing hops for harvesting.

FIG. 3 is an expanded sectional view along line 3—3 of FIG. 2 showing in some detail the position of the vertically projecting blades in relation to the rotary cutters.

FIG. 4 is an expanded sectional view along lines 4—4 of FIG. 2 showing in detail the extreme end of the crossarm assembly on which is mounted a rotary cutter and vertically projecting blade.

FIG. 5 is a partial view of the crossarm assembly mounted on the front end of the power vehicle showing it straddling a row of vertically suspended hop vines.

DETAILED DESCRIPTION OF THE INVENTION

Hops are usually grown by training the hop vines along strings running from the ground to overhead row wires as shown in FIG. 5. The machine of this invention prepares the hop vines for harvesting by severing the vines and the strings on which they are trained near the base of the vine. The vines may then be stripped of their foliage at their lower end, if desired, by a suitable stripping assembly. The foliage is stripped from the lower ends of the hop vines so that they can be used in hop-picking equipment wherein the vine hangs pendant from the lower stem as it moves through the picking zone of the equipment, such as described, for example, in U.S. Pat. No. 2,699,172.

FIG. 1 shows an overall view of the machine of this invention. As shown, the machine can be divided into three sections, the assembly 10 for severing the interconnected hop vines and guiding the vertically suspended hop vines to a cutting zone where they are severed near their base, guiding assembly 40 for guiding the severed vines to a stripping zone and the striping assembly 50.

Referring to assembly 10, the vertically suspended hop vines are severed near their base by a series of rotary cutters mounted at appropriate heights on a crossarm assembly attached to a suitable power means such as a tractor. Because hop vines tend to traverse the distance between the strings on which they are trained and interconnect with the adjacent hop vines, vertical blades projecting into the paths of the vine are mounted on the crossarm assembly to sever the interconnecting vines, separate the vines and guide the severed vines to the cutting zone.

Assembly 10, in more detail, comprises frame 11 attached to the front of a suitable powered means such as the front of a tractor, as shown in FIG. 2. Frame 11 has vertical members 12 attached to it (see FIG. 3) and plate 13 is attached to vertical members 12. To plate 13 is attached a crossarm 14 of any desired length. As shown in FIG. 5 the crossarm is preferably of a length sufficient to span at least three hop rows although it may be made longer or shorter if desired. The crossarm may be made adjustable to any desired length by inserting extension arms 15a and 15b (see FIGS. 2 and 4) in the ends of crossarm 14. Although extension arms 15a and 15b can be adjusted to suitable lengths manually, it is desirable to be able to adjust them hydraulically. To this end hydraulic cylinders 16a and 16b are mounted on crossarm 14 with their pistons linked to extension arms 15a and 15b through suitable linkages.

At points on crossarm 14 and extension arms 15a and 15b substantially equaling the distance between hop rows, there are mounted blades 17a, 17b and 17c which project vertically and forwardly of crossarm 14 (see FIG. 5). These blades preferably have a sharp forward edge so that, on advancement of the machine along the hop rows, the blades will sever any interconnecting hop vines. Blades 17a, 17b and 17c may be made removable by mounting them in scabbards 18a, 18b and 18c as shown in FIG. 3 so that they can easily be removed and replaced should they be broken. The scabbards and blades are connected to the frame of assembly 14 and/or to extension arms 15a and 15b of crossarm 14.

Referring to FIGS. 2 and 3, blade 17b and scabbard 18b are attached to plate 13 by an L-shaped member 19. The two end blades 17a and 17c are attached to extension arms 15a and 15b (see FIG. 4) by a swivel mounting 20. Although this swivel mounting is not necessary, it is desirable in order to prevent breaking of the blades should unintended objects intervene.

Also attached to the plate 13 and/or to the extreme ends of extension arms 15a and 15b are rotary cutters 21a, 21b and 21c mounted on shafts 22 and driven by hydraulic motors 23 or other suitable means. The rotary cutters are mounted slightly in front of each of the projecting blades and at predetermined heights for severing the hop vine stems near their base. As shown in FIGS. 3 and 4, the rotary cutters are made vertically adjustable by attaching them to supports 24a, 24b and 24c which project through sleeves 25 secured to frame member 13 or extension arms 15a and 15b. Set screws are used to hold the rotary cutters at predetermined positions. The rotary cutters on the ends of the extension arms may be made to swivel for the same reasons as described in connection with blades 17a and 17c. As shown in FIG. 4, rotary cutters 21a and 21b are pivotably attached to extension arms 15a and 15b at points 26a and 26c.

There may also be attached to assembly 10 at suitable locations a series of elongated rods 27 which project outwardly and downwardly in relation to the path of the hop vines. These rods assist in guiding the hop vines to the cutting zone defined by the rotary cutters 21a, 21b and 21c.

The entire crossarm assembly is preferably made vertically adjustable so that the height of blades 17a, 17b and 17c can be adjusted. As shown in FIG. 3, vertical adjustment may be by means of a suitable hydraulic cylinder 28 attached to frame 11 with the piston of the hydraulic cylinder attached to plate 13 on which crossarm 14 is mounted.

After the hop vines have been severed, they are guided by a guiding assembly 40 to a stripping zone where the foliage on the lower ends of the vines is removed. The guiding assembly comprises a series of rods 41, 42, 43 and 44 suitably located to engage the severed vines and guide them to stripping assembly 50 as the machine is advanced along the hop rows. As shown in FIGS. 1 and 2, rods 41 and 44 are connected at one end to the extreme end of extension arms 15a and 15b by means of upright standards 45 and 46 and at the other end to vertical baffle plates 51 associated with the stripping assembly to be described later. Rods 42 and 43 are attached at one end to upright standard 47 and at the other end to vertical members 48 and 49 adjacent the stripping zone. It should be understood that these or other rods may be mounted in any location desired where they are needed to best guide the severed hop vines to the stripping zone.

The severed vines, guided by the guiding assembly 40, next move into a stripping zone where the lower foliage of the vine is removed. The stripping zone, best shown in FIG. 2, is an area between vertical baffles 51 and beaters 52. The distance between plates 51 and beaters 52 may be varied to achieve optimum results. Either plates 51 or beaters 52, or both, may be made adjustable to this end. Plate 51 and beaters 52 are mounted on frame 63 comprising crossarms 64 and 65, separated by rails 66a, 66b, 66c and 66d. As shown in FIG. 1, baffles 51 are adjustably mounted to crossarms 64 and 65 by means of C-clamps. Frame 63 also has attached to it vertical members 67 which come together to form pivot point 68. Frame 63 is attached to the power vehicle by linking member 69 attached at one end to pivot point 68 and at the other end to the power vehicle, both attachment points being flexible. Crossarm 64 of the stripping assembly is attached to the hydraulic lift of the power vehicle through suitable linking members 70, 71 and 72. On actuation of the hydraulic lift of the power vehicle, the horizontal linking members 70 are pulled forward or backward causing frame 63 to tilt up or down about pivot point 68. In this manner the positions of the beaters 52 can be changed with respect to the hop vines entering the stripping zone. For example, if the forward end of frame 63 is tilted down so that crossarm member 64 is lower with respect to the ground than crossarm 65, the forward end of beaters 52 is correspondingly lower. Hop vines entering the stripping zone will thus have their foliage progressively stripped from their point of severance upward.

Beaters 52 comprise cylindrical ends 53 interconnected by a series of bars 54. On each of the bars 54 is a series of U-shaped resilient stripping members 55. Beaters 52 are driven by hydraulic motors 56 or by other suitable means. The stripping members 55, coacting with baffles 51, act to strip the foliage from the hop vines as they are advanced through the stripping zone.

When preparing the machine for operation, extension arms 15a and 15b of the crossarm assembly are adjusted hydraulically or otherwise to the spacing of the hop rows, as shown in FIG. 5. The height of blades 17a, 17b and 17c is adjusted by means of hydraulic cylinder 28 to a suitable height. Rotary cutters 21a, 21b, and 21c are also adjusted to cut the vertically suspended hop vines at an appropriate point. As the machine is advanced through the hop rows, blades 17a, 17b, and 17c, projecting into the rows of the hop vines, sever the connecting vines and guide them into each of the cutting zones defined by the rotary cutters. Rods 27 assist in this regard. The vertically suspended vines are severed near their base by rotary cutters and are then guided to the stripping zone by the rods and guiding assembly.

The embodiments of the invention in which an exclusive property or privilege is claimed are defined as follows:

1. A machine for preparing hops for harvesting having a frame adapted to be propelled along one or more rows of hop vines trained on severable supports extending from the ground to overhead supports, comprising:

vertically projecting means mounted on the frame adapted to project between one or more rows of the vertically suspended hop vines to separate and sever hop vines interconnected between the rows and aid in guiding pendant vertically suspended vines to a cutting zone in the path of the vertically suspended vines as the machine advances along the rows of hop vines, cutting means mounted on the frame in the cutting zone for severing the vertically suspended hop vines near their base, means for guiding the pendant ends of the base-severed and vertically suspended hop vines from the cutting zone to a stripping zone, and stripping means in the stripping zone for stripping the foliage from the lower pendant ends of the vertically suspended and base-severed hop vines without removal of the vines from the severable and overhead supports.

2. The machine of claim 1 wherein the means for separating, severing and guiding comprises a crossarm assembly adapted to straddle at least one row of hop vines, vertically disposed blades mounted on the crossarm assembly projecting into the path of the vines being disposed so as to engage the vertically suspended vines, sever interconnecting vines, and guide the vines to the cutting zone.

3. The machine of claim 1 wherein the cutting means comprises cutters disposed near the base of the vertically disposed blades, to sever the lower ends of the planted hop vines.

4. The machine of claim 1 wherein the stripping means comprises two opposed elements defining a stripping zone between them, the first of the elements being a vertically disposed baffle and the other element having movable members projecting into the stripping zone disposed so as to engage the lower portion of the hop vines advancing through the stripping zone, the baffle and stripping members coacting to strip the foliage from the lower ends of the vines.

5. The machine of claim 1 wherein the extreme ends of the crossarm assembly are adjustable in a lateral direction and a plurality of vertically disposed blades, placed apart a distance substantially equaling the distance between the rows of planted hops, are removably attached to the crossarm assembly.

6. A machine for guiding vertically suspended hop vines into a cutting zone and severing them near their base comprising:
   a crossarm assembly adapted to straddle at least one row of hop vines, the crossarm extending in a direction normal to the rows of hops,
   power means for advancing the crossarm assembly along the hop vine rows,
   a plurality of vertically disposed blades, adjustable to and away from one another, mounted on the crossarm assembly and spaced a distance apart substantially equaling the distance between the hop rows, the blades projecting into the path of the vines and disposed so as to engage the vertically suspended vines and guide them into the cutting zone,
   a series of rotary cutters, one adjacent the base of each of the vertically disposed blades, each of these cutters defining a cutting zone and functioning to sever the lower ends of the hop vines advanced into the cutting zone.

7. The machine of claim 6 including a plurality of elongated rods disposed adjacent the rotary cutters and projecting into the path of the hop vines for assisting in guiding the lower ends of the hop vines into the cutting zone.

8. The machine of claim 6 including means for vertically adjusting the rotary cutters and blades.

9. The machine of claim 6 wherein the forward edges of the vertically projecting blades are sufficiently sharp to sever the interconnecting vine.

10. A machine for stripping the foliage from the lower ends of base-severed vertically suspended hop vines comprising:
    a frame,
    two opposed elements mounted on the frame defining a stripping zone therebetween, the first element being a vertically disposed baffle and the second element a stripping member having cylindrical ends between which are attached a plurality of bars extending longitudinally of the cylindrical ends, a shaft journalled axially of the cylindrical ends, a plurality of resilient U-shaped fingers mounted on the bars, and means for rotating the stripping member, and
    means for feeding hop vines into the stripping zone.

11. The machine of claim 10 wherein the stripping member comprises cylindrical ends between which are attached a plurality of bars extending longitudinally of the cylinders, a shaft journaled axially of the cylindrical ends, a plurality of resilient U-shaped fingers mounted on the bars, and means for rotating cylinders.

References Cited

UNITED STATES PATENTS

| | | | |
|---|---|---|---|
| 2,645,893 | 7/1953 | Horst, Jr. | 56—126 |
| 3,090,183 | 5/1963 | Thomson | 56—17 |

ROBERT PESHOCK, Primary Examiner